Dec. 29, 1953   F. O. HESS ET AL   2,664,283
FURNACE CONTROL SYSTEM
Filed July 17, 1947   4 Sheets-Sheet 1

INVENTORS
Frederic O. Hess
James Kniveton
BY
ATTORNEY

INVENTORS
Frederic O. Hess
James Kniveton
BY
ATTORNEY

Dec. 29, 1953  F. O. HESS ET AL  2,664,283
FURNACE CONTROL SYSTEM
Filed July 17, 1947  4 Sheets-Sheet 3

INVENTORS
Frederic O. Hess
James Kniveton
BY
ATTORNEY

Patented Dec. 29, 1953

2,664,283

UNITED STATES PATENT OFFICE 2,664,283

FURNACE CONTROL SYSTEM

Frederic O. Hess, Philadelphia, and James Kniveton, Wyncote, Pa., assignors to Selas Corporation of America, Philadelphia, Pa., a corporation of Pennsylvania Application July 17, 1947, Serial No. 761,602

21 Claims. (Cl. 263—3)

This invention relates to metal heating furnaces, and more particularly to means for controlling the temperature of a series of furnaces, means for controlling the temperature of work heated in the furnaces, and means for controlling the passage of the work through the furnaces.

In the heating of metal tubes or rods, for example, it has been the custom to place a number of tubes in a furnace and let them remain there for a period of time sufficient to bring them up to the desired temperature. Such heating requires equipment that uses a large amount of space and the method requires that the tubes or rods remain in the furnace for substantial periods of time. It has also been found that if the tubes are heated unevenly along their lengths when they are put into the furnace that they will usually be unevenly heated when they are taken out of the furnace. This is particularly objectionable when the next operation performed on the tubes is in a sinking or sizing mill.

The present invention has for its main object the provisions of a method and means for uniformly heating an elongated metallic body such as a tube or rod to an even temperature throughout its length. This is accomplished by passing the tube or rod axially through a plurality of relatively short tubular furnaces each of which, or groups of which may be individually controlled to apply the amount of heat required for successive portions of the tube or rod. This type of construction is of particular advantage in that a minimum of floor space is required for the furnaces and a maximum of flexibility may be obtained.

In practicing the invention a number of comparatively small tubular furnaces are aligned end to end so that the work, which will be referred to herein as a tube, may be passed serially through them. Placed between furnaces and beyond the first and last furnaces are rollers which support and forward the tube through its path of travel. These rollers may be driven collectively or individually as desired at speeds depending upon the initial and desired temperatures of the tube, its size and the heat capacity of the furnaces.

The furnaces are preferably heated with burners that use a mixture of gas and air to heat a ceramic block to incandescence to produce a radiant heat. The products of combustion also help to heat the tube by convection. In practice these products of combustion exhaust from the ends of the furnace under pressure so that they envelop the portion of the tube passing between the various furnaces and thereby prevent it from being cooled. The furnaces are supplied either singly or in groups with a combustible mixture of gas and air from any suitable type of mixing apparatus, and have as one of their characteristics the ability to change rapidly in temperature and heating rate upon a change in the fuel supply.

In order that the tubes may be uniformly heated from end to end suitable control instruments are provided to adjust the fuel supply to each furnace or group of furnaces so that it will supply the correct amount of heat to each portion of each tube as it is passing therethrough. To this end there is provided a temperature responsive device which responds to the temperature of the tube prior to the time that it enters the furnace or group of furnaces. This device through suitable control apparatus is used to pre-set heating capacity of the furnace or group of furnaces for the requirements for each portion of each tube. The work performed by each furnace along the path of tube travel becomes less, as the tube is heated. Accordingly the last furnaces really perform an evening and soaking function. Instruments are also provided which are responsive to furnace temperature. These serve to limit or cut-off the supply of fuel if the temperature of the furnaces should become dangerously high.

In additon to the above, additional controls are provided which are responsive to the passage of a tube through the furnace. These controls are so arranged that when a tube is passing through a given furnace or group of furnaces fuel will be supplied thereto in accordance with the temperature of the tube. When, however, no tube is passing through the furnace the fuel supply will be throttled to some predetermined minimum value.

Tubes of different sizes require different amounts of heat to bring them up to a given temperature for a furnace of a given heat capacity. Accordingly provision is made to vary the speed of the rolls which move the tube through the furnace. The tube is moved into the furnace at a comparatively high speed as it is received from some machine, such as a piercing mill. When it is completely in the furnace its passage is slowed down to a speed that is predetermined for a given tube. After being heated the tube is ejected from the furnace at a high rate of speed to another machine, such as a sinking mill. The speed of the tube through the furnace is controlled automatically by mechanism that is responsive to its position therein.

An object of the invention is to provide heating equipment to bring rapidly an elongated body up to a temperature that is uniform along its length. Another object of the invention is to provide a method whereby an elongated body may be rapidly heated to a uniform temperature along its length.

A further object of the invention is to provide apparatus for determining the amount of heat that must be applied to an object and automatically adjusting the heat output of the furnace to apply this heat to the object. It is a further object of the invention to provide apparatus for controlling the temperature of a furnace so that it may not exceed a given predetermined value. Another object of the invention is to so correlate the temperature control for the object and for the furnace that the object may be heated as rapidly as possible without harming the furnace structure.

It is also an object of the invention to provide a method and means to control the speed of a conveyor mechanism for moving an object to be heated through a furnace.

It is also an object of the invention to provide an integrated temperature and speed control system for a multiple furnace unit whereby elongated metal objects may be accurately and rapidly heated to a uniform temperature from end to end.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Figure 1:
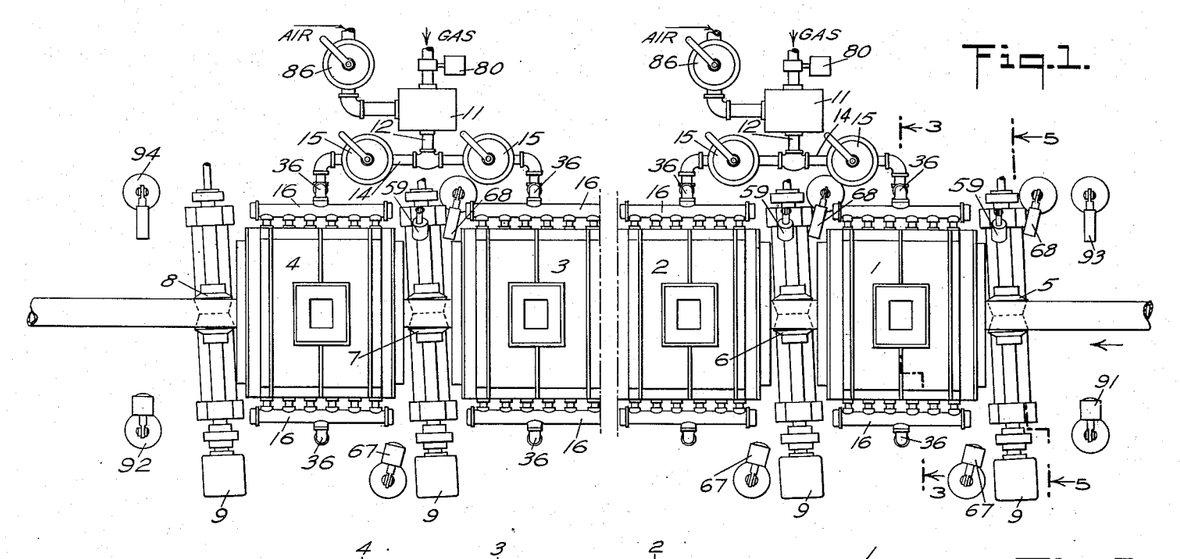
Figure 1 is a top view diagrammatically showing the furnace control system of the present invention.
Figure 2:
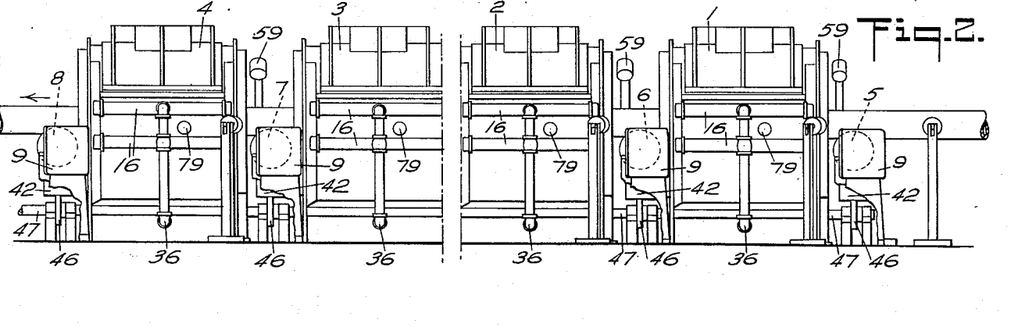
Figure 2 is a diagrammatic view from the side showing portions of the furnace control system.

The tubes, or other elongated material, which are to be heated preferably are taken from some machine, such as a piercing machine and heated by the control system of this invention to a proper temperature along the length of the tube so that they may be handled properly in another machine, such as a sinking or sizing mill. As shown in Figures 1 and 2, the furnace system may include any necessary number of furnaces that are required to bring the tube up to temperature. In those figures, there is shown a first and last furnace 1 and 4 through which the tube passes and intermediate furnaces 2 and 3 similar to those shown at 1 and 4 may be used in the complete furnace control system.

Located in front of the first furnace and beyond the last furnace, with the tube travel from the right to the left in the drawing, are a pair of conveyor rolls 5 and 8. Also located between the furnaces are additional conveyor rolls 6 and 7, which support the tube and forward it from one furnace to the other. Each of these conveyor rolls is driven by an individual motor 9 which may have its speed adjusted to some value dependent upon the position of the tube, the size of tube and upon the heat which is required to be transferred to the tube. As shown, each pair of furnaces is supplied with a gas and air mixture from a mixing machine 11 which may well take the type shown in Hess Patent No. 2,243,704. The air and gas mixture is supplied from a mixing machine through a pipe 12 and branch pipes 14 so that each mixing machine is used to supply two furnaces. Located in the branch pipes 14 are valves 15 that control the supply of the combustible mixture to the individual furnaces.

Figure 3:
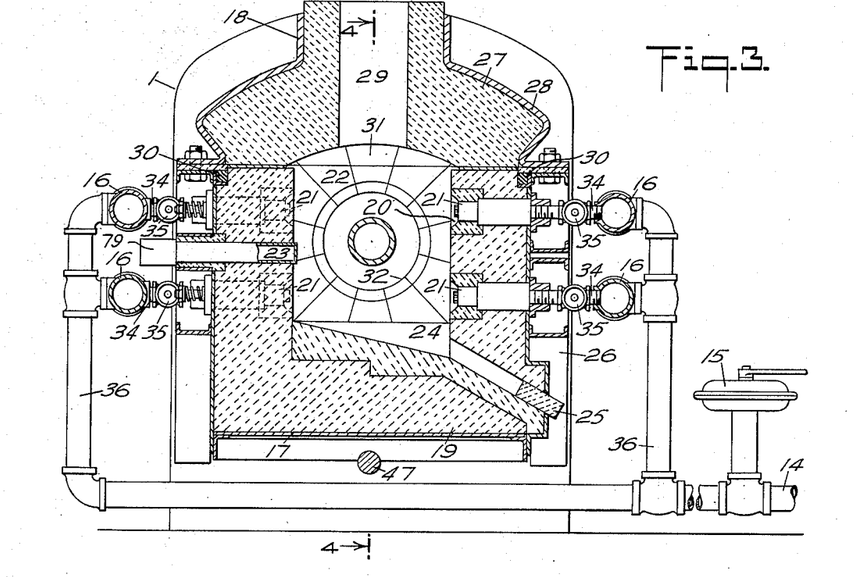
Figure 3 is a sectional view of the furnace taken on line 3—3 of Figure 1.
Figure 4:
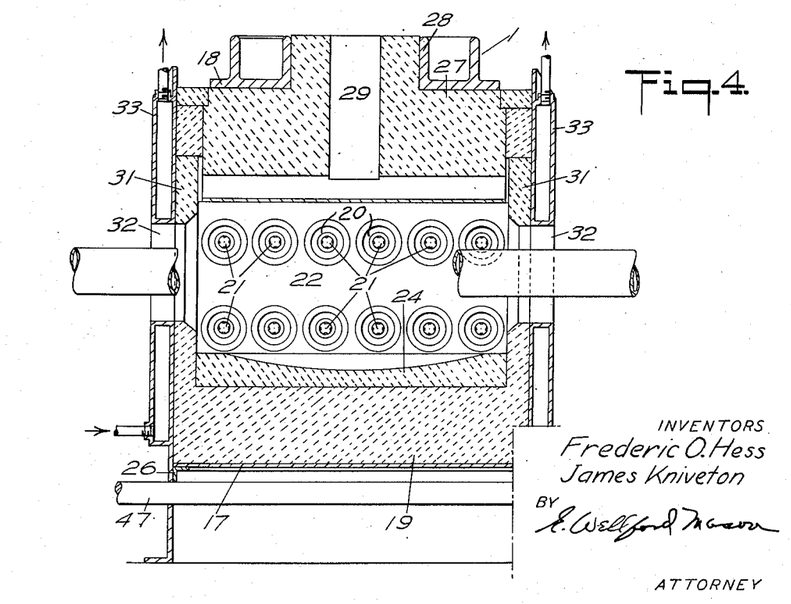
Figure 4 is a sectional view taken on line 4—4 of Figure 3.
Figure 5:
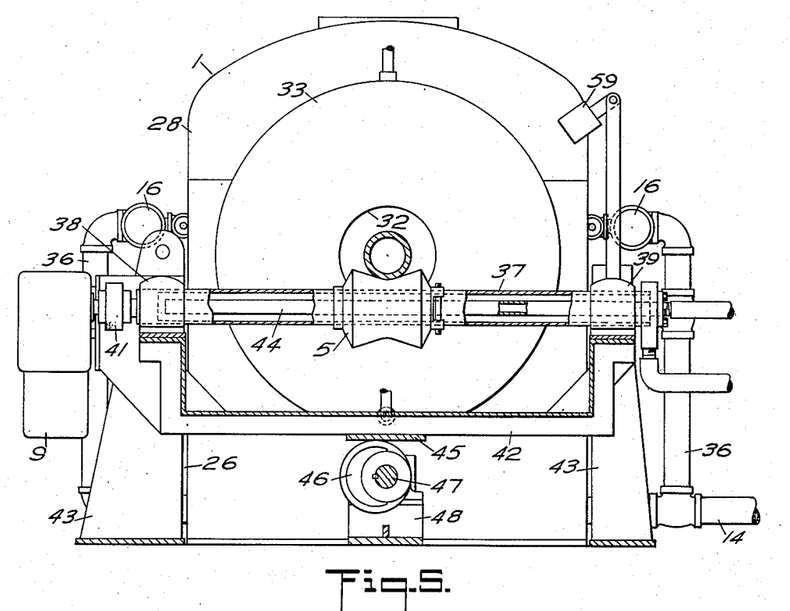
Figure 5 is an end view of a furnace and conveyor roller taken on line 5—5 of Figure 1.

Referring to Figures 3 to 5, inclusive, it will be seen that each furnace includes a body part 17 and top 18 that are suitably fastened together. The bottom is made of ceramic blocks properly shaped so that they may be fitted together to form the furnace chamber. Portions of the sides of the furnace chamber indicated at 22 consist of burners 21 that may well take the type of burner which is disclosed in Hess Patent No. 2,215,079. These burners are provided with cups 20 that are heated to incandescence by a plurality of small gas flows that burn to complete combustion within the confines of the cup. Radiant heat is projected from these cups at high intensity to the interior of the furnace chamber 22.

It will be seen that the burners themselves, as explained in the above-mentioned patent, provide radiant walls for the furnace so that heat is directed toward the tube as it passes through the furnace chamber. Also formed in one of the side walls of the furnace at 23 is a sighting tube through which a radiation pyrometer may be used to measure the interior temperature of the furnace. The bottom of each furnace is provided with a depression 24 that is formed of some suitable heat resisting material and which opens to the exterior of the furnace so that scale, dirt and other material may be removed therefrom from time to time. This opening is normally closed with a block 25. The ceramic blocks 19 forming the furnace structure 6 are reinforced and held in place by a suitable metal frame 26.

The chamber is closed by the top 18 which also consists of suitable heat resisting and insulating ceramic blocks 27 that are held in place by a metal frame 28. The center of the furnace is provided with a vent opening 29 through which the products of combustion may escape. The top and body sections of the furnace are bolted together, as shown in the drawing, but may be separated from time to time in order to inspect and repair the furnace, when this is necessary. It is noted that asbestos packing 30 is attached to the edge of the top member so that as the top is lowered in place this packing will help form a tight fit around the joints between the two portions of the furnace.

Each end of the furnace chamber 22 is formed of an end wall 31, that is also formed of heat resisting and insulating ceramic material. These blocks are held in place by a metal, water-cooled wall 33 through which water is forced from a suitable source of supply. The water is pumped into the lower portion of the water jacket as shown by the arrow and removed from the top thereof. The end walls of the furnace are formed with circular openings 32 through which the tube being heated is passed by the conveyor rollers.

Each of the burners is supplied by an individual pipe 34 which has a valve 35 in it that may be adjusted. By this means each burner can be adjusted to deliver its proper amount of heat in order that the tube is heated the correct amount as it moves through the furnace. There are six burners shown in each group and each of these groups is supplied by a manifold 16. These manifolds are connected with a distributing pipe 36 that is connected with the downstream side of valve 15. Therefore, it will be seen that adjustment of the valve 15 will regulate the amount of fuel going to a given furnace, whereas adjustment of valves 35 can be used to regulate the amount of gas going to the individual burner.

The heat supplied to the furnace is almost entirely radiation heat from the cups 20 of each burner; the remainder being supplied from the hot products of combustion. Since a change in fuel supply will change rapidly the amount of heat radiated by each burner, it will be seen that the heating effect of the furnace can be changed rapidly in response to fuel changes. This is an important feature because if this heating effect could not be changed rapidly it would be impossible to control accurately the temperature of the tubes along their lengths.

Feed rollers 5, 6, 7 and 8 are mounted, as shown in Figure 5. In that figure, the roller 5 is attached to a hollow shaft 37, that is mounted in suitable bearings 38 and 39. One end of the shaft is attached by means of a coupling 41 to an individual motor 9 so that the shaft may be rotated at the proper speed. It is noted that these shafts are placed at an angle to the axis of the furnace as is best shown in Figure 1, so that as the tube is moved through the furnace, it will be slowly rotated. This serves to prevent sagging of the tube as it is being heated. Bearings 38 and 39 are mounted in the end of a U-shaped frame 42, which frame is in turn mounted for sliding movement in supports 43 that are suitably attached to the base of the machine. Since various diameter tubes may be heated in the furnace, means is provided to raise and lower the guide rolls, so that the axis of the tube being heated will always be concentric with the axis of the opening 32 formed in the ends of the furnace. To this end a hardened plate 45 is attached to the bottom of yoke 42. This plate bears upon the periphery of a cam 46, that is attached to a shaft 47. The shaft carrying the cam is journaled in bearings 48 and may extend the full length of each furnace and have on it a plurality of cams, one for each of the roller supporting frames, so that as the shaft is rotated all of the rolls of the furnace system will be raised or lowered simultaneously to the proper height for the tube which is being treated at that time.

As is noted above, each furnace is supplied with an air and gas mixture from a mixer 11 through pipe 14. Located in this pipe 14 is the air control valve 15 which is a pneumatically operated valve of the normally closed type. Each of these valves (see Figure 6) has a seat 51 which is normally movable in a closing direction by means of a spring 52. The valve is opened by means of air pressure applied in a chamber formed at the right of a diaphragm 53. This diaphragm is supplied with air through a pipe 54, solenoid valve 55 and tube 56 from a potentiometer type control instrument 57.

Figure 6:
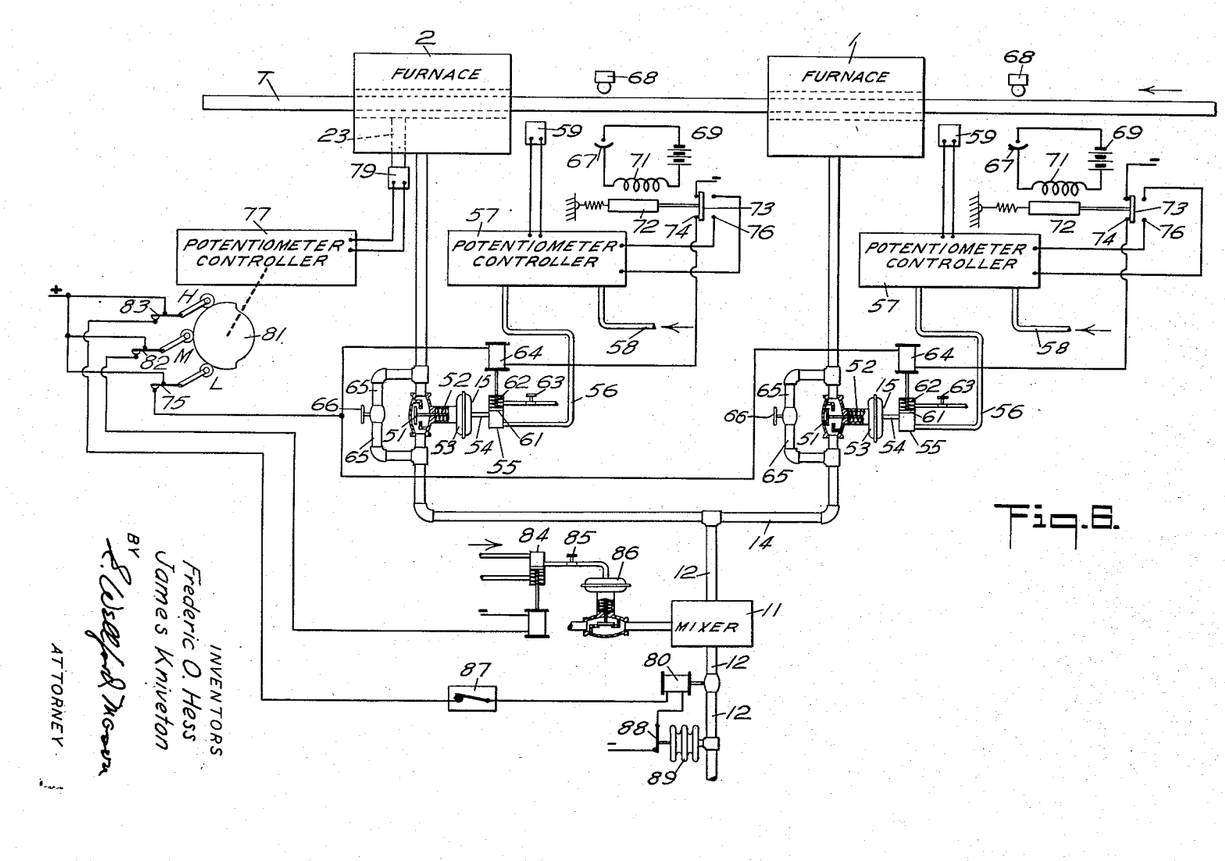
Figure 6 is a diagrammatic view of the control system for regulating the temperature.

Instruments of this type are well known, and they operate to adjust the supply of air from a regulated source, which is supplied to them through a pipe 58, so that the air pressure produced by the instrument is throttled in accordance with the temperature which is being measured. This throttled air is supplied to the valve to regulate its opening in accordance with the temperature under measurement. The potentiometer has as its primary element in this case, a radiation responsive device 59 that is directed toward the tube prior to its passing through the furnace. The control point of the potentiometer controller is adjusted to the temperature to which the tube is to be heated. Therefore, as the entrance temperature of the tube varies, the output air pressure from the potentiometer is varied in accordance therewith so that fuel will be supplied to the furnace in an amount sufficient to bring the tube to its desired temperature. It is noted that the radiation responsive device is located so that it is directed toward the tube as the tube enters the furnace. In this fashion the fuel supply for the furnace is pre-set in accordance with the temperature of the tube to supply more or less heat as the tube varies in temperature along its length. Since the heating effect of the furnace will change rapidly with changes in fuel supply, this heating effect will be set to the proper value when the tube reaches the furnace. Thus the tube is heated in a manner to compensate for cold or hot spots along its length.

The solenoid valve 55 which is located between the pipes 54 and 56 has a valve member 61 that is normally biased downwardly by means of a spring 62, and which is kept in its upward position, as shown in the drawing when its actuating solenoid is energized during the normal operation of the control system. When however, the solenoid 64 is de-energized, so that spring 62 can move valve member 61 downwardly, the air which has been supplied to diaphragm 63 can exhaust to the atmosphere at a rate which is regulated by the adjustment of a restriction valve 63 located in the exhaust pipe from the solenoid valve. Therefore, if for some reason the solenoid is de-energized, valve 15 will be closed at a rate dependent upon the adjustment of valve 63. It is noted that a by-pass 65 having a manually adjusted valve 66 in it is placed around valve 15. Therefore, when valve 15 is closed a predetermined amount of combustible mixture can be supplied to the furnace to keep this furnace at some desired minimum temperature.

In the operation of the control system, it is desirable to maintain the furnace at a desired minimum temperature which can be obtained by the proper adjustment of valve 66 at all times when a tube is not passing therethrough. In order to accomplish this, there is provided a photo electric control circuit, which acts as a supervisory control for the air system for valve 15. This control system includes a photo electric cell 67 that is responsive to a beam of light projected from a suitable light source 68. This light source is so positioned that its beam is intercepted when a tube is passed through the furnace. As diagrammatically shown in the drawing the photo electric cell is included in a circuit having a battery 69 and a solenoid 71. When no tube is passing through the furnace, light will shine on the cell and thereby permit it to conduct current so that the solenoid will be energized. When, however, a tube is passing through the furnace, the light beam will be intercepted and tube 67 will not pass current. Therefore core 72 of the solenoid will be moved to the left under the influence of a spring so that contact 73 will bridge contacts 74 and thereby close the circuit from the upper contact 74 through the solenoid 64 and through a limit switch 75 to the other side of the line. It is noted that when solenoid 71 is energized due to the fact that no tube is passing in front of the photo electric cell, contact 73 will bridge contacts 76 which are in a so-called "Blocking circuit" of the potentiometer controller. When contacts 76 are closed, the control mechanism of the potentiometer will remain in the position in which it was last adjusted. The reason for this blocking circuit is that if such a circuit were not used, the potentiometer would tend to increase the air pressure to its maximum whenever a tube was not passing in front of radiation head 59. Therefore, when another tube passes in front of the head, there would be a sudden surge of heat due to the wide open valve 15 before that valve can be partially closed. By blocking the potentiometer in its last position, the air supply to valve 15 will be held at some value corresponding to the temperature of the last tube and since the tubes fed through the furnace will usually be somewhere near the same temperature, the valve will be in a position to supply approximately the same amount of fuel to the furnace without the bouncing effect that would otherwise be obtained. It is noted that the operation of solenoid 71 may be made slow so that after a tube is passed between the photo electric cell and light source 68, the solenoid will be de-energized slowly enough so that radiation head 59 will heat up prior to the time that contact 73 bridges contact 74. This permits the radiation head to heat up and be at full temperature by the time it can assume control of the furnace.

Since the firing of the furnace is determined by the temperature to which the tube is to be heated some limit control means must be provided to prevent the furnace sections from becoming too hot. This is accomplished by having the temperatures of each of the furnaces supplied by a single mixer, supervised by a second potentiometer controller 77 which serves as a limit controller. This potentiometer is operated in response to the temperature of a radiation head 79 that is directed toward the closed end of sighting tube 23 which is included in the side of the furnace. As is shown, in Figure 5, the closed end of this tube will be directed to the interior of the furnace and will be at substantially the same temperature as the furnace, therefore, the potentiometer 77 will respond to furnace temperature. As the potentiometer responds to different temperatures, a cam rotated thereby in any conventional manner is moved in a clock-wise direction with increase in temperature. This cam controls the operation of limit switch 75, mentioned above, and in addition also controls the operation of limit switches 82 and 83. It will be seen that as the temperature of the furnace approaches the danger point, cam 81 will be rotated so that switch 75 will be open. The opening of this switch will also cause de-energization of solenoid 64 and cut-down the fuel supplied to the furnace. If for some reason the furnace should continue to heat up after the fuel supply is cut-down, excess air is supplied to the furnace to cool it down. To this end continued rotation of cam 81 will permit switch 82 to open. This switch is located in the circuit of a solenoid valve 84 that is in the air supply line for a pneumatic valve 86. Valve 86 when open supplies excess air for the furnaces through mixer 11. It is noted that switch 75 controls all of the valves 15 in gas lines leading to furnaces supplied by the same mixer. When solenoid valve 84 is de-energized, it will cut-off the supply of air to valve 86 and permit this valve, which is spring opened, to open, so that a greater percentage of air than normal will be fed through the mixer to pipes 14. It is noted that valve 86 could be a solenoid valve and operated directly by switch 82 if desired.

Additional heating by the furnace at this point will cause the gas supply to be entirely cut-off. To this end continued rotation of cam 81 will permit switch 83 to open. This switch is located in the control circuit for a normally closed, electrically opened valve 80 in the gas supply to mixer 11. Upon opening of switch 83 valve 80 will be de-energized and closed to shut off the main gas supply. It is noted that the circuit including switch 83 and valve 80 also includes a switch 87 that can be in a safety blowout in the gas supply line to the furnace and a pressure responsive switch 88, which is operated by a bellows 89. The bellows 89 is subjected to the main line gas pressure so that if for some reason the gas pressure should reduce below a safe amount switch 88 will open.

From the above description, it will be seen that when a tube is passing through the furnace, a potentiometer 57 will be controlling the temperature of each furnace to bring each furnace up to a temperature which is necessary in order to heat the tube to the desired value. These potentiometers, however, are rendered inoperative when no tube is passing through the furnace and each one blocked in the position of control according to the temperature of the last tube which passed through it. Each pair of furnaces that is supplied by a single mixer is also supervised by a safety control including a potentiometer 77 responsive to the temperature of one of the furnaces. Upon increase in furnace temperature toward a danger point the gas supply is shut down to a minimum value and if the furnace temperature should increase further, additional air is supplied to the combustible mixture. When the danger point is reached the gas supply to the furnace is shut off.

In the above disclosure, it has been assumed that each mixer 11 is capable of supplying the amount of gas and air necessary for two furnaces and therefore, a limit controller 77 is used for each pair of furnaces that is supplied by a single mixer. It will be observed, however, that if the furnaces have a capacity larger than can be supplied by a single mixer, an additional limit control will be used for each furnace. It will also be obvious that a single potentiometer controller can be used for each pair of furnaces instead of having a potentiometer for each furnace if it is so desired. The number of potentiometers that are used and their piping arrangements between mixers and the furnaces can be regulated in accordance with the particular circumstances necessary to each control installation. A feature that is of importance is that the radiation heads 59 be located in front of the furnaces, as far as the path of travel of the tube is concerned, that they are to regulate. Therefore, each furnace will be regulated to produce the heat that is necessary in order to bring the given portion of a tube passing through it up to the desired temperature. It is also of importance that each mixer is controlled by a supervisory controller 77 whether the mixer is used for one or more furnaces.

As was mentioned above, the speed of the drive rollers 5 through 8, which feed the tube through the various furnaces is controlled in accordance with the size and type of tube. There is shown herein a means for regulating the speed of the tube in response to these factors and further in response to the position of the tube, so that when a tube is fed from some machine, such as a piercing machine to the group of furnaces, it may come in at a high speed and when it is fully in the furnaces, it is slowed down to another speed and will continue through the furnaces. As the tube passes from the last furnace, it is speeded up again and will be fed at a suitable speed to another machine, which may well be a sinking mill.

In order to accomplish the above result, there is provided means responsive to a tube as it enters the furnace and responsive to a tube as it leaves the furnace. To this end, a photo electric cell 91 is positioned at the entrance end of the first furnace and a second cell 92 is positioned at the exit end of the last furnace. These cells are subjected to beams of light from sources 93 and 94, respectively, which beams may be intercepted as a tube is passing into and out of the respective furnaces. As shown diagrammatically in Figure 7 of the drawing, cell 91 forms part of a circuit including a battery 95, a solenoid coil 96. When no tube is passing through the furnace light shines on the cell to make it conductive. Current can then flow in the circuit so that solenoid 96 is energized to move its core 97 to the right against the force of a normal spring bias. When, however, a tube is passing through the furnace, light from the source 93 will be intercepted so that the photo electric cell becomes non-conductive. When this occurs, core 97 will be moved to the left by a spring so that its bridging contact 98 will close contacts 99. When the core is moved to the right bridging contact 98 will close a circuit including contacts 100.

Figure 7:
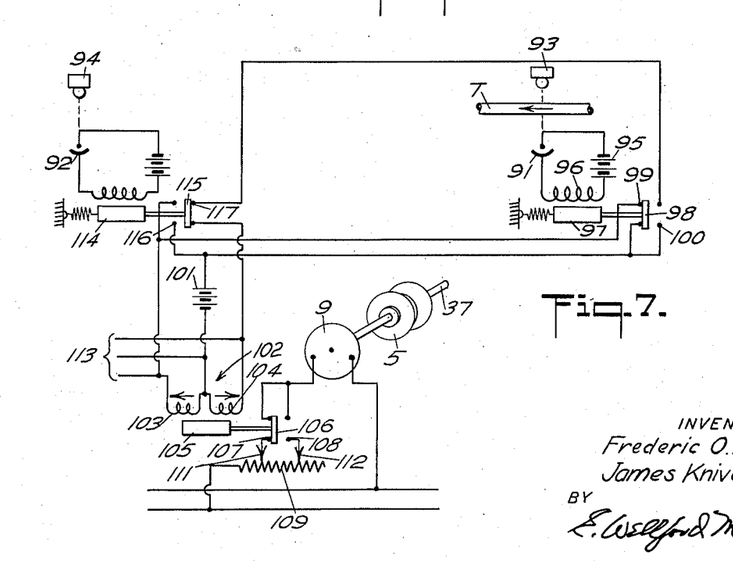
Figure 7 is a diagrammatic view of the speed control system for the conveying mechanism.

The position of contact 98 is used to control the motor speed by operating a relay switch 102 in one direction or in an opposite direction. This depends upon whether current from a battery 101 in the circuit is flowing through coil 103 or coil 104 of the relay. As shown in the drawing, a tube is entering the furnace and therefore has intercepted the beam of light falling on photo electric cell 91. Therefore bridging contact 98 engages contacts 99 to close a circuit through the battery and coil 103 of relay 102. Accordingly core 105 of the relay is moved to the left so that bridging contacts 106 will close contacts 107. These contacts are located in the speed control circuit of one of the roll driving motors 9, which includes a resistance 109, one end of which is connected to one side of the line, the other side of the line going direct to the motor. A pair of adjustable taps are taken off the resistance, one of which 111, leads through contacts 107 to the motor. Therefore, with the parts in the position shown a small amount of resistance will be in the motor circuit so that the motor is rotating at a high speed. After the tube has passed to the left into the furnace the beam of light from source 93 again shines on the photo electric cell 91 and causes energization of coil 96 so that bridging contact 98 may move to the right to close contacts 100. When this takes place, a circuit is completed through coil 104 of relay 102. This causes core 105 to move to the right so that contact 106 will bridge contacts 108. This opens the circuit through contacts 107 and bridges contacts 108 that are in a circuit including a second tap 112 on the resistance 109. Therefore more resistance is placed in the motor circuit thus causing a slower rate of speed. It must be understood that the speed of the motor and the position of the taps 111 and 112 will be pre-set in accordance with the size of the tube that is to be heated and the type of material of which it is made, as well as the amount of heat that must be absorbed by the tube. In parallel with the coils 103 and 104, as well as with battery 101, there are indicated wires 113 which go to similar relays for each of the drive motors. Thus, all of the motors for the complete furnace system are speeded up and slowed down simultaneously.

The tube is now in the furnace system and will continue at a slow rate of speed and be heated individually by each furnace until it is brought up to the proper temperature, the furnaces being so adjusted that this will occur prior to the time that the tube emerges from the last furnace. When the tube emerges from the last furnace it will pass between light source 94 and photo electric cell 92 and render cell 92 non-conductive to stop current from flowing in the circuit of that cell. Therefore core 114 will be moved to the left by a spring to open contacts 117 breaking the circuit for relay coil 104. Simultaneously the bridging contact 115 will close contacts 116 and again complete a circuit for coil 103 of the relay, thereby moving bridging contact 106 to the left so that the motors will be speeded up. This continues until the tube has passed completely from the furnace when the beam of light from source 94 can again shine on photo electric cell 92 and render it conductive. At this time core 114 will again move to the right causing the roll drive motors to be slowed down. The motors will remain at their slow speed until another tube is fed into the furnace. Preferably the arrangement is such that a second tube will be fed into the furnace just as the first tube is leaving so that the motors will be run at a high speed all of the time except when a tube is completely within the furnace system.

Generally speaking enough furnaces are provided in the system so that the tube being treated will be brought up to temperature prior to the time it has reached the last one or two furnaces. Thus the last furnaces act as a means to hold the temperature and soak the tube in its passage. In some cases, it may be desirable to use the last furnace to produce a special atmosphere so that some heat treating effect will be obtained on the surface of the tube. For example, the combustible mixture in each of the furnaces can be made slightly oxidizing so that a thin film of scale will be formed on the surface of the tube during its passage through the system. If the last furnace is provided with a surplus of fuel over air, so that a reducing atmosphere is obtained, this scale will be removed during the passage of the tube through the last furnace so that a clean surface will be obtained. Another alternative is to supply the last furnace with an atmosphere which will carburize the surface of the tube. It must be remembered that only a comparatively small length of time is required to effect the desired surface treatment as the work is up to temperature and will be acted upon rapidly by any atmosphere.

From thhe above description, it will be seen that a furnace control system is provided in which a plurality of furnaces are located in the path of movement of a tube or other elongated body to be heat treated. Each of these furnaces has a supervisory control on it that is responsive to the temperature of the furnaces so that there is no possibility of the furnaces being damaged due to excess temperature. Each of the furnaces has this control interlocked with a throttling control that pre-adjusts the supply of fuel in response to the temperature of the body to be treated. By having the temperature responsive device located in front of the furnace, the amount of heat supplied by each furnace can be pre-set for the amount of heat that is required by the tube or any portion thereof. This insures that each furnace will do its proper share of work and that each tube will be treated along its length so that various portions of the tube will receive the amount of heat that is necessary for those portions. The result is that each tube passing through the furnace is accurately heated to the desired temperature throughout its length. There are no hot spots or cold spots through the length of each of the tubes when it is ejected from the last furnace of the system.

The control means regulating the speed of the conveyor roll is, of course, coordinated with the remaining controls so that the speed with which the tube passes through the furnace is coordinated with the amount of heat that each furnace can supply to the tube in its passage therethrough, as a result of which superior type of heat treating of each tube is obtained.

While in accordance with the provisions of the statutes we have illustrated and described the best form of embodiment of our invention now known to us, it will be apparent to those skilled in the art that changes may be made in the form of the apparatus disclosed without departing from the spirit and scope of our invention, as set forth in the appended claims, and that in some cases certain features of our invention may be used to advantage without a corresponding use of other features.

Having now described our invention, what we claim as new and desire to secure by Letters Patent, is:

1. In a furnace control system, the combination of a plurality of axially aligned furnace sections through which elongated work is successively passed, an individual fuel supply for each furnace, individual means responsive continuously to the temperature of the work as it enters each furnace section, control mechanism to adjust individually the supply of fuel to each furnace section, connections between the responsive means for each furnace section and the control mechanism for that section to impress the responses of said means on said mechanism whereby the control mechanism will adjust the fuel supply for each furnace section in accordance with the temperature of the work entering that section.

2. In a furnace control system, the combination of a furnace, means to supply a combustible mixture of gas and air to said furnace, means responsive to the temperature of said furnace, and mechanism operated by said responsive means upon the attainment of a first predetermined temperature to adjust said supply means to reduce the supply of combustible mixture, upon the attainment of a second predetermined temperature to adjust said supply means to increase the proportion of air in said combustible mixture, and upon the attainment of a third predetermined temperature to adjust said supply means to cut off the supply of gas to said combustible mixture.

3. In a furnace control system, the combination of a furnace, means to supply a combustible mixture of gas and air to said furnace including a mixing device having an air supply and a gas supply, mechanism responsive to the temperature of said furnace, first means operated by said mechanism upon the attainment of a first predetermined temperature to reduce the supply of combustible mixture to said furnace, second means operated by said mechanism upon the attainment of a second predetermined temperature to increase the air supply to said mixing device, and third means operated by said mechanism upon the attainment of a third predetermined temperature to cut off the gas supply to said mixing device.

4. In a furnace control system, the combination of a furnace through which work to be heated is passed, means to forward work through said furnace, a variable speed motor to drive said means, mechanism to vary the speed of said motor, and means to operate said mechanism, said means being located at the entrance and exit of said furnace and responding to the passage of work therethrough.

5. In a furnace control system, a furnace through which work to be heated is passed, means to forward work through said furnace, variable speed drive mechanism for said forwarding means, a first means responsive to the passage of work to said furnace, a second means responsive to the passage of work from said furnace, a relay device to adjust said drive mechanism, and means to control said device operated jointly by said first and second responsive means to adjust the speed of said variable speed drive mechanism.

6. In a furnace control system, the combination of a furnace through which work to be heated is passed, means to supply fuel to said furnace, means responsive to the temperature of the work entering said furnace to adjust said supply means, means responsive to the passage of work into said furnace, means responsive to furnace temperature, mechanism operative to produce an adjustment of said supply means to reduce the supply of fuel to said furnace, and means to operate said mechanism by said passage responsive means only when no work is entering said furnace and by said furnace temperature responsive means only when the furnace temperature is above a predetermined value.

7. In a furnace control system, the combination of a furnace through which work to be heated is passed, means to supply fuel to said furnace, temperature responsive means to respond to the temperature of the work as it enters said furnace, means to connect said temperature responsive means to adjust said supply means in accordance with said temperature, means responsive to the passage of work into said furnace and including means operative when no work is passing thereto to render said responsive means inoperative to adjust said supply means and to assume control of said supply means and produce an adjustment thereof to reduce the fuel supplied to said furnace, said passage responsive means including means to delay the return of control of said supply means to said temperature responsive means for a given time period after a work piece starts into said furnace.

8. In a furnace control system, the combination of a furnace through which work to be heated is passed, supply means for fuel for said furnace, variable speed drive mechanism to forward work through said furnace, means responsive to the passage of work through said furnace operative to adjust the speed of said drive mechanism in accordance with the passage of work through said furnace, and means responsive to the temperature of the work entering said furnace operative to adjust said supply means to supply fuel to said furnace to bring said work to a given temperature regardless of the speed at which the work is moving.

9. In a furnace control system, the combination of a plurality of axially aligned furnace sections through which work is to be successively passed to be brought up to a given temperature in a series of steps, mixing machines each having an air inlet and a gas inlet to supply a combustible mixture of gas and air to a group of said furnace sections, means responsive to the temperature of the work entering each of said furnace sections, valve means operated by said responsive means to control the supply of mixture to each furnace section individually, means responsive to the temperature of one furnace section of each group, mechanism operated by said last-mentioned means and including a supervisory device for each furnace section to adjust said valve means and reduce the supply of mixture to each furnace section of said group upon the attainment of a predetermined high temperature in said one furnace section, and means individually responsive to the passage of work into each of said furnace sections to operate said supervisory device when no work is passing into the furnace section.

10. In a furnace control system, a furnace through which work to be heated is passed, means to supply fuel to said furnace, a pneumatic control valve in said supply means, means responsive to the temperature of the work entering said furnace and operative to vary the pressure of a supply of air in accordance therewith, a pipe through which air is supplied under pressure from said response means to said control valve, an auxiliary valve in said pipe and adjustable from a first position in which air can pass to said control valve to a second position in which air cannot pass to said control valve, said auxiliary valve normally being in its first position, and means responsive to the temperature of said furnace and operative upon increase in furnace temperature above a predetermined value to produce a movement of said auxiliary valve to its second position.

11. The combination of claim 10 in which there is means responsive to the passage of work to said furnace, and mechanism operative by said means when no work is passing to said furnace to produce a movement of said auxiliary valve to its second position.

12. In a furnace control system, the combination of a furnace, means to supply a variable combustible mixture of gas and air to said furnace including a mixing machine having a gas inlet and an air inlet and means in said inlets to adjust the flow therein, means responsive to the temperature of said furnace, and mechanism operated by said responsive means upon the attainment of a first predetermined temperature to adjust said supply means to reduce the supply of combustible mixture, and upon the attainment of a second predetermined temperature to adjust the adjustable means in the air inlet to increase the proportion of air in said combustible mixture and upon the attainment of a third predetermined temperature to adjust the adjustable means in the gas inlet to cut off the supply of gas to said combustible mixture.

13. In a furnace control system, the combination of a furnace through which work is passed intermittently, a valve normally biased in a closed direction to control the supply of fuel to said furnace, means responsive to the temperature of work entering into said furnace connected to adjust said valve in opposition to its bias whereby the supply of fuel will be regulated in accordance with work temperature, mechanism responsive to the passage of work to said furnace, and means operated by said mechanism when no work is passing to said furnace to disconnect said valve from said responsive means whereby said valve may close at that time to reduce the supply of fuel to said furnace.

14. The combination of claim 13 including means operated by said mechanism to delay the operation of said responsive means after a piece of work has entered said furnace.

15. In a furnace control system, the combination of a furnace through which work to be heated is passed intermittently, a valve to control the supply of fuel to said furnace, means responsive to the temperature of work entering said furnace, a control instrument connected to said responsive means and said valve operative to produce adjustments of said valve in accordance with the responses of said responsive means, mechanism responsive to the passage of work to said furnace, and means operated by said mechanism when no work is passing to said furnace to disconnect said valve from said control instrument.

16. The combination of claim 15 including means operated by said mechanism when no work is passing to said furnace to render said control instrument inoperative to make any adjustments.

17. In a furnace control system, the combination of an elongated furnace through which work to be heated is passed, variable speed means to forward work through said furnace, first means responsive to the passage of work into said furnace, second means responsive to the passage of work from said furnace, control mechanism for said variable speed means, and a device connected to and operated by said first and second responsive means to adjust said mechanism and thereby said variable speed means in accordance with whether or not work is passing into and out of said furnace.

18. The combination of claim 17 in which said control mechanism includes means to speed up or slow down said variable speed means, means operated by said responsive means to speed up said variable speed means when work is entering or leaving said furnace, and means operated by said responsive means to slow down said variable speed means at other times.

19. A control system for a furnace through which an article is moved to be heated comprising, in combination, means for supplying fuel to the furnace, pressure responsive valve means for controlling the flow of fuel through said fuel supply means, means for supplying a pressure fluid to said pressure responsive means, means including an element arranged at one end of said furnace and responsive to the temperature of the article as the latter moves past it for controlling the flow of pressure fluid through said fluid supply means, and means responsive only to the presence of the article for controlling the operativeness of said flow controlling means, said last mentioned means including a light sensitive cell and a light source arranged at said one end of the furnace so that the path between them may be intercepted by said article and operating only when the light path is intercepted to render the flow controlling means operative to control the flow of fluid in response to temperature changes.

20. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, means responsive to the presence of said article for rendering said last mentioned means inoperative to control the flow of pressure fluid in response to temperature changes except when the article is passing said element, and means responsive to the presence of said article for positioning said second mentioned valve means to connect said pressure responsive means to said supply connection while the article is passing through the furnace.

21. A control system for a furnace through which an article is moved to be heated comprising, in combination, means for supplying fuel to the furnace, pressure responsive valve means for controlling the flow of fuel through said fuel supply means, fluid supply and exhaust connections for said pressure responsive means, valve means for connecting said pressure responsive means selectively to said supply and exhaust connections, said valve means normally connecting said pressure responsive means to said exhaust connection, means including a temperature responsive element arranged at one end of the furnace to be subjected to the heat of the article as it passes by, said last mentioned means normally operating in response to the temperature subjected on said element for controlling the flow of pressure fluid through said supply connection, means arranged adjacent said element and sensitive to the presence of the article, and means connected to said last mentioned means and controlling said second mentioned valve means and the operativeness of said means controlling the flow of pressure fluid in response to changes in temperature, said connected means operating when the article is in the presence of said sensitive means to open said second mentioned valve means and to render said flow controlling means operative.

FREDERIC O. HESS.
JAMES KNIVETON.

References Cited in the file of this patent
UNITED STATES PATENTS

| Number | Name | Date |
| --- | --- | --- |
| 1,285,750 | Lewis et al. | Nov. 26, 1918 |
| 1,946,971 | Harter | Feb. 13, 1934 |
| 1,962,676 | Albright | June 12, 1934 |
| 1,978,701 | Dreffein | Oct. 30, 1934 |
| 1,981,631 | Northrup | Nov. 20, 1934 |
| 1,984,051 | Biggert | Dec. 11, 1934 |
| 2,025,542 | Lugar | Dec. 24, 1935 |
| 2,037,032 | Martin | Apr. 14, 1936 |
| 2,048,162 | Kriechbaum | July 21, 1936 |
| 2,171,362 | Gulliksen | Aug. 29, 1939 |
| 2,205,182 | Whitten | June 18, 1940 |
| 2,273,126 | McGillin | Feb. 17, 1942 |
| 2,293,550 | Kells | Aug. 18, 1942 |
| 2,360,167 | Schumann | Oct. 10, 1944 |
| 2,370,897 | Whitcomb | Mar. 6, 1945 |
| 2,540,966 | Swain | Feb. 6, 1951 |